United States Patent
Rush, Jr. et al.

(10) Patent No.: US 12,160,474 B2
(45) Date of Patent: Dec. 3, 2024

(54) RANDOMIZATION OF HEARTBEAT COMMUNICATIONS AMONG MULTIPLE PARTITION GROUPS

(71) Applicant: Hitachi Vantara LLC, Santa Clara, CA (US)

(72) Inventors: David Rush, Jr., Northborough, MA (US); Kevin Canuette Grimaldi, Waltham, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 18/015,350

(22) PCT Filed: Aug. 3, 2020

(86) PCT No.: PCT/US2020/044704
§ 371 (c)(1),
(2) Date: Jan. 10, 2023

(87) PCT Pub. No.: WO2022/031258
PCT Pub. Date: Feb. 10, 2022

(65) Prior Publication Data
US 2023/0283663 A1    Sep. 7, 2023

(51) Int. Cl.
*H04L 67/1097* (2022.01)
*G06F 16/27* (2019.01)
*H04L 43/10* (2022.01)

(52) U.S. Cl.
CPC ........ *H04L 67/1097* (2013.01); *G06F 16/278* (2019.01); *H04L 43/10* (2013.01)

(58) Field of Classification Search
CPC ... H04L 67/1097; H04L 43/10; G06F 16/278; G06F 9/5061
See application file for complete search history.

(56) References Cited

U.S. PATENT DOCUMENTS 9,069,827 B1 *  6/2015  Rath ................ G06F 16/25
9,984,140 B1 *  5/2018  Sukumaran ........... G06F 16/27
(Continued)

FOREIGN PATENT DOCUMENTS

| JP | 2010277467 A | * 12/2010 | |
| JP | 2012-504807 A | 2/2012 | |
| WO | WO-2010137229 A1 | * 12/2010 | ....... H04L 12/40013 |

OTHER PUBLICATIONS

"Performance Analysis of Distributed Database Based on Raft", Information Processing Society of Japan besides Akira Kajiwara 5 Research Report System Software and Operating System (OS) 2017-0S-140, 1-9 Pages, Date of Issue May 9, 2017. (Year: 2017).*

(Continued)

*Primary Examiner* — Cheikh T Ndiaye
(74) *Attorney, Agent, or Firm* — MATTINGLY & MALUR, PC

(57) ABSTRACT

In some examples, a first computing device of a plurality of computing devices may be a member of a first partition group. For example, the first partition group may correspond to a first partition of multiple partitions of a metadata database. The first partition group may include at least one other computing device. Furthermore, each of the plurality of computing devices may maintain at least one partition of the metadata database so that the metadata database is partitioned into multiple partitions distributed across the computing devices. The first computing device may determine a first time threshold for a heartbeat communication to be sent to the other computing device(s) in the first partition group, and may select a random time before the first time threshold. The first computing device may send, based on the selected random time, the heartbeat communication to the other computing device(s) in the first partition group.

20 Claims, 6 Drawing Sheets

(56) References Cited

U.S. PATENT DOCUMENTS

| | | | |
|---|---|---|---|
| 2011/0178985 A1* | 7/2011 | San Martin Arribas | ............... G06F 16/278 707/E17.007 |
| 2017/0251063 A1* | 8/2017 | Tang | ............... H04L 67/01 |
| 2017/0270176 A1* | 9/2017 | Horowitz | ............ G06F 11/2097 |
| 2019/0173666 A1* | 6/2019 | Ardashev | ............. H04L 9/0637 |

OTHER PUBLICATIONS

International Search Report of PCT/US2020/044704 dated Oct. 23, 20220.

Japanese Office Action received in corresponding Japanese Application No. 2023-507340 dated Jan. 16, 2024.

Kajiwara, A., "Performance Analysis of Distributed Database Based on Raft", Information Processing Society of Japan, May 9, 2017, pp. 1-9, vol. 2017-OS-140, No. 15.

Extended European Search Report received in corresponding European Application No. 20948248.8 dated Mar. 20, 2024.

Marius, R. et al., "Fault tolerant consensus protocol for distributed database transactions", Management Engineering Software Engineering and Service Sciences, Jan. 14, 2017, pp. 90-93, New York, NY.

* cited by examiner

RANDOMIZATION OF HEARTBEAT COMMUNICATIONS AMONG MULTIPLE PARTITION GROUPS

TECHNICAL FIELD

This disclosure relates to the technical fields of databases and storage management.

BACKGROUND

Multi-partitioned distributed databases may provide horizontal scalability by dividing data amongst multiple computing devices, also referred to as "computing nodes". As data is added to a system, horizontal scaling can be provided by increasing the number of computing nodes and the number of partitions, which improves access to the data in the respective partitions by controlling the size of the respective partitions. Thus, some systems that include a large amount of data may have a very large number of partitions.

In some cases, the Raft (reliable, replicated, redundant, and fault-tolerant) consensus algorithm may be employed to manage the redundancy and consistency of the respective partitions. According to the conventional Raft algorithm, a leader of a Raft group may send periodic communications (also referred to as "heartbeat communications") to the followers in the Raft group according to a pre-determined invariable schedule. As the number of Raft groups in which each node participates is scaled up, the number of heartbeat communications sent and/or received within a heartbeat period also increases. This can lead to a situation in which the number of heartbeat communications can cause congestion that can trigger an unnecessary sequence for electing a new leader or other undesirable results.

SUMMARY

In some implementations, a first computing device of a plurality of computing devices may be a member of a first partition group. For example, the first partition group may correspond to a first partition of multiple partitions of a metadata database. The first partition group may include at least one other computing device. Furthermore, each of the plurality of computing devices may maintain at least one partition of the metadata database so that the metadata database is partitioned into multiple partitions distributed across the computing devices. The first computing device may determine a first time threshold for a heartbeat communication to be sent to the other computing device(s) in the first partition group, and may select a random time before the first time threshold. The first computing device may send, based on the selected random time, the heartbeat communication to the other computing device(s) in the first partition group.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
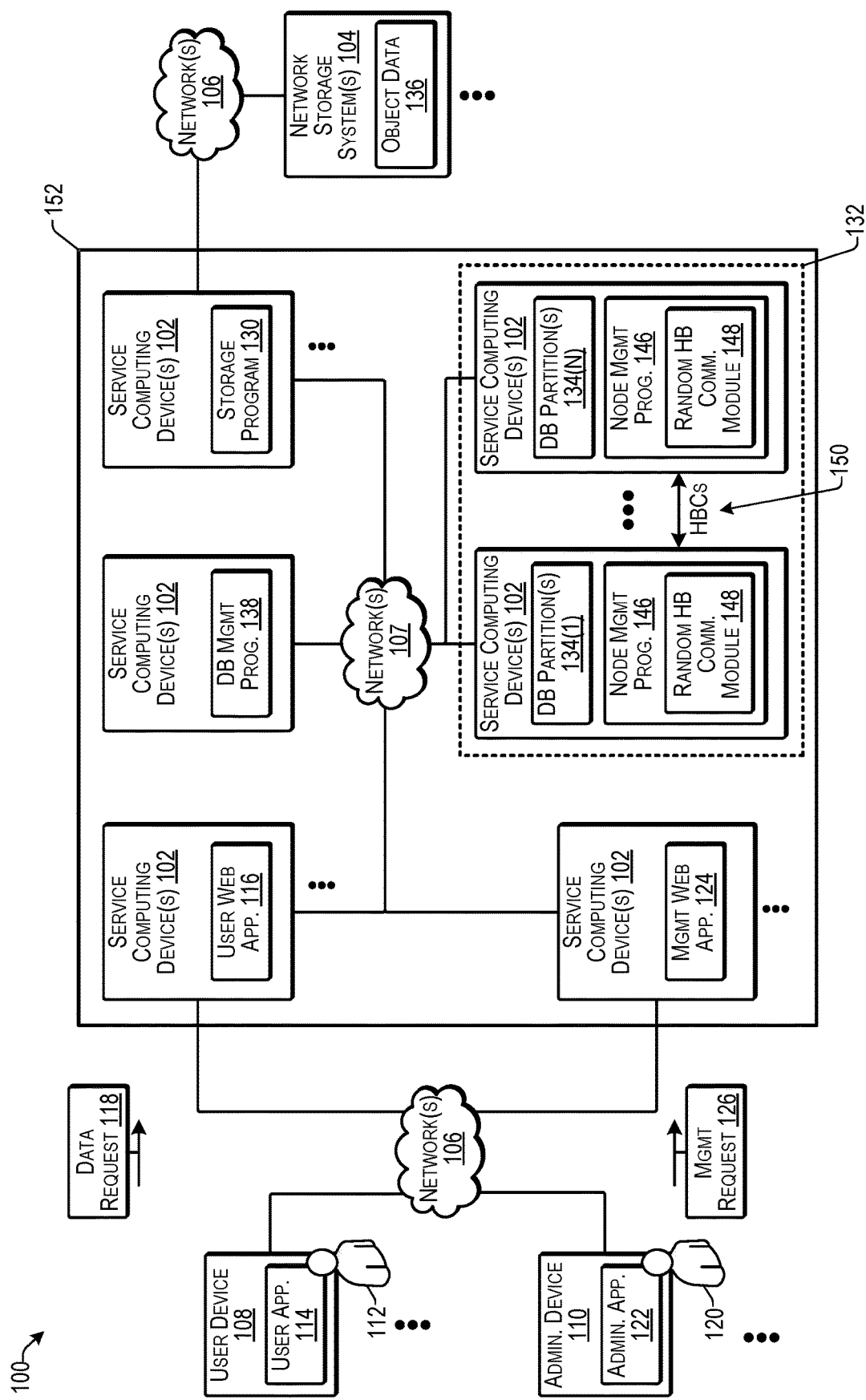
FIG. 1 illustrates an example architecture of a system including partitioned data and randomized heartbeat communications according to some implementations.

Some implementations herein are directed to techniques and arrangements for randomizing heartbeat communications across a plurality of partition groups to achieve an optimal efficiency of a distributed database or other distributed system including a plurality of computing nodes. According to some implementations, a leader of a partition group may randomize the timing of a heartbeat communication to send to the partition group followers. In some examples, the randomized timing may be at least partially based on a maximum duration heartbeat communication interval. Further, in some cases, the maximum duration heartbeat interval may be based at least in part on the heartbeat timeout interval for the partition group.

As one example, implementations herein may employ a uniformly distributed randomized heartbeat communication to ensure that partition group leaders and followers are sending and processing, respectively, a minimal number of heartbeat communications at any given time while still conforming to the requirements of the Raft algorithm or other implemented algorithm. Accordingly, the examples herein may increase the probability that each heartbeat communication is sent and processed successfully. For instance, by randomizing the heartbeat communications, the computing nodes herein may process fewer heartbeat communications concurrently at a given time, thereby increasing the reliability and performance of the system, such as by preventing or otherwise minimizing unnecessary new leader elections when a current leader device is actually functioning properly.

Some examples herein employ randomization of times for heartbeat communications within partitions on computing nodes having a plurality of partitions. For instance, the system herein may focus the randomization of heartbeat communication periods on the leader devices to avoid having to perform synchronization or other specific management of heartbeat communication timing across the computing nodes and partitions, which could be expensive in terms of increasing network congestion and consumption of computational resources. Further, some examples herein may consider specific node characteristics for integrating randomization of the heartbeat communication interval into the Raft consensus algorithm.

Some examples herein may be implemented in an object storage system that is able to scale to trillions of objects and with the ability to be deployed across multiple geographic locations. The system herein may include a distributed metadata store that may serve as a distributed database of metadata. In some cases, the system herein may include a purpose-built metadata store that uses many non-relational distributed database concepts. One such concept employed herein may include the partitioning of the metadata data into multiple manageable chunks referred to as partitions. In some examples, each partition may be configured on a partition group of computing devices, such as a Raft group with one leader and one or more followers. The Raft groups may be used to provide redundancy to each partition, such as for replicating data updates from the partition leader to the partition follower(s) and for otherwise managing consistency of the data that the partition encompasses.

For discussion purposes, in some examples herein, the partitions may contain metadata of a metadata database that describes data stored in one or more storage node, such as external storage nodes, storage nodes within the system, cloud storage devices, or the like. However, implementations herein are not limited to these applications, and may apply to other types of data, databases, storage configurations, and the like. Furthermore, some example implementations are described in the environment of a plurality of service computing devices in communication with a cloud storage or other network storage system for managing storage of data using a distributed metadata database. However, implementations herein are not limited to the particular examples provided, and may be extended to other types of computing system architectures, other types of storage environments, other types of client configurations, other types of data, other types of consensus algorithms, and so forth, as will be apparent to those of skill in the art in light of the disclosure herein. For example, implementations herein are not necessarily limited to Raft groups, but may be extended to other types of groups that include a leader that sends periodic heartbeat communications to followers.

FIG. 1 illustrates an example architecture of a system 100 including partitioned data and randomized heartbeat communications according to some implementations. The system 100 includes a plurality of service computing devices 102 (also referred to as "computing nodes" in some examples) that are able to communicate with, or otherwise coupled to, at least one network storage system(s) 104, such as through one or more networks 106. Further, the service computing devices 102 are able to communicate over the network(s) 106 with one or more user computing devices 108 and one or more administrator computing devices 110, which may be any of various types of computing devices, as discussed additionally below.

In some examples, the service computing devices 102 may include one or more servers that may be embodied in any number of ways. For instance, the programs, other functional components, and at least a portion of data storage of the service computing devices 102 may be implemented on at least one server, such as in a cluster of servers, a server farm, a data center, a cloud-hosted computing service, a distributed computing system, and so forth, although other computer architectures may additionally or alternatively be used. Additional details of the service computing devices 102 are discussed below with respect to FIG. 6.

The service computing devices 102 may be configured to provide storage and data management services to users 112. As several non-limiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein.

The network storage system(s) 104 may be referred to as "cloud storage" or "cloud-based storage" in some examples, and, in some cases, may enable a lower cost storage solution per gigabyte than local storage that may be available at the service computing devices 102. Furthermore, in some examples, the network storage system(s) 104 may include commercially available cloud storage as is known in the art, while in other examples, the network storage system(s) 104 may include private or enterprise storage systems, storage arrays, or the like, accessible only by an entity associated with the service computing devices 102, or combinations cloud storage and private storage.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102, the network storage system(s) 104, the user devices 108, and the administrative devices 110 are able to communicate over the one or more networks 106 using wired or wireless connections, and combinations thereof.

In addition, the service computing devices 102 may be able to communicate with each other over one or more networks 107. In some cases, the one or more networks 107 may be a LAN, private network, or the like, while other cases, the one or more networks 107 may include any of the networks 106 discussed above.

Each user device 108 may be any suitable type of computing device such as a desktop, laptop, tablet computing device, mobile device, smart phone, wearable device, terminal, and/or any other type of computing device able to send data over a network. Users 112 may be associated with user devices 108 such as through a respective user account, user login credentials, or the like. Furthermore, the user devices 108 may be able to communicate with the service computing device(s) 102 through the one or more networks 106, through separate networks, or through any other suitable type of communication connection. Numerous other variations will be apparent to those of skill in the art having the benefit of the disclosure herein.

Further, each user device 108 may include a respective instance of a user application 114 that may execute on the user device 108, such as for communicating with a user web application 116 executable on the service computing device(s) 102, such as for sending user data for storage on the network storage system(s) 104 and/or for receiving stored data from the network storage system(s) 104 through a data request 118 or the like. In some cases, the application 114 may include a browser or may operate through a browser, while in other cases, the application 114 may include any other type of application having communication functionality enabling communication with the user web application 116 and/or the service computing devices 102 over the one or more networks 106.

In the system 100, the users 112 may store data to, and receive data from, the service computing device(s) 102 that their respective user devices 108 are in communication with.

Accordingly, the service computing devices 102 may provide local storage for the users 112 and respective user devices 108. During steady state operation there may be users 108 periodically communicating with the service computing devices 102.

In addition, the administrator device 110 may be any suitable type of computing device such as a desktop, laptop, tablet computing device, mobile device, smart phone, wearable device, terminal, and/or any other type of computing device able to send data over a network. Administrators 120 may be associated with administrator devices 110, such as through a respective administrator account, administrator login credentials, or the like. Furthermore, the administrator device 110 may be able to communicate with the service computing device(s) 102 through the one or more networks 106, 107, through separate networks, and/or through any other suitable type of communication connection.

Further, each administrator device 110 may include a respective instance of an administrator application 122 that may execute on the administrator device 110, such as for communicating with programs executing on the service computing devices 102 to manage the plurality of service computing devices 102. As one example, the administrator application 122 may communicate with a management web application 124 executable on the service computing device(s) 102, such as for sending management instructions for managing the system 100, as well as for sending management data for storage on the network storage system(s) 104 and/or for receiving stored management data from the network storage system(s) 104, such as through a management request 126 or the like. In some cases, the administrator application 122 may include a browser or may operate through a browser, while in other cases, the administrator application 122 may include any other type of application having communication functionality enabling communication over the one or more networks 106 with the management web application 124 or other programs executing on the service computing devices 102.

The service computing devices 102 may execute a storage program 130, which may provide a gateway to the network storage systems(s) 104, such as for sending data to be stored to the network storage systems(s) 104 and for retrieving requested data from the network storage systems(s) 104. In addition, the storage program 130 may manage the data stored by the system 100, such as for managing data retention periods, data protection levels, data replication, and so forth.

The service computing devices 102 may further include a database (DB) 132, which may be divided into a plurality of DB partitions 134(1)-134(N) and which may be distributed across a plurality of the service computing devices 102. As one example, the DB 132 may be used for managing object data 136 stored at the network storage system(s) 104. The DB 132 may store or may otherwise include numerous metadata about the object data 136, such as information about individual objects, how to access the individual objects, storage protection levels for the object data 136, storage retention periods, object owner information, object size, object type, and so forth. Further, a DB management program 138 may manage and maintain the DB 132 such as for adding new service computing devices 102 to the DB 132, coordinating updating of the DB 132 as new objects are stored, old objects are deleted, objects are migrated, and the like. In addition, in some examples that DB management program 138 may monitor the size of the partitions 134 on each of the service computing devices 102. For instance, the DB management program 138 may determine to send an instruction to split a partition 134, such as based on the partition 134 reaching a partition size threshold, a traffic volume threshold, a response latency threshold, or the like.

The partitions 134 may include a plurality of partitions distributed across multiple ones of the service computing devices 102. In some examples, a plurality of the service computing devices 102 that include the partitions 134(1)-134(N) may be configured as Raft groups in a Raft consensus algorithm configuration for management of partitioned data, such as for providing redundancy of the DB 132 at multiple service computing devices 102. The partitioned DB 132 herein may provide scalability by partitioning the metadata and distributing the metadata across distinct service computing devices 102 that serve as a plurality of DB computing nodes.

Furthermore, the service computing devices 102 may include a node management program 146 that is executed by the respective service computing devices 102 to manage the data stored by that respective service computing device 102 and to perform other functions attributed to the service computing devices 102 herein. For example, the node management program 146 may include a random heartbeat (HB) communication module 148 that generates random or pseudorandom heartbeat communications (HBCs) 150 for the partition(s) for the which the respective service computing device 102 is a leader device. The node management program 146 on each respective node may send the generated heartbeat communication(s) 150 to the respective follower devices for the corresponding partition(s). In addition, the node management program 146 may receive and process the heartbeat communications 150 received from other leader devices for which the respective node maintains follower partitions.

In some examples herein, each partition 134 may be configured to operate according to the Raft consensus algorithm, such as to provide redundant backups of the data stored in the partitions. For example, the Raft algorithm ensures that each service computing device 102 agrees upon the same change to data in a respective partition. The Raft group achieves consensus via an elected leader, e.g., a particular service computing device 102 in a Raft group that includes a particular partition may be either the leader or a follower for the particular partition. The leader may be responsible for replication of changes to the partition data to the follower service computing devices 102. The leader may regularly inform its followers of its existence by sending the heartbeat communications 150 to the followers, such as continually within a specified timeframe as long as the leader device maintains the leadership role.

At least some of the service computing devices 102 may maintain a partition mapping between partition map entries and Raft groups. When a service computing device 102 receives a request from a client, the partition mapping may be consulted to determine to which Raft group the request belongs. If the service computing device 102 does not have a mapping for a particular request, an error may be returned to the requesting client. Otherwise, the request may be forwarded to the correct Raft group. If the service computing device 102 is the leader of that Raft group, the request is serviced by the service computing device. Otherwise, such as in the case that the service computing device is a follower of that Raft group, an error is returned to the requesting client containing the connection information of the leader of Raft group. Accordingly, the requesting client is provided information in the returned error message as to which service computing device to redirect the request.

The Raft algorithm may employ two types of Remote Procedure Calls (RPCs) to carry out various functions. One type of RPC is a RequestVotes RPC that may be sent by one or more candidate nodes to gather votes during an election to select a new leader for the Raft group. A second type of RPC is an AppendEntries RPC that may be used by the leader device for replicating log entries or other data updates to the follower devices. In addition, the AppendEntries RPC may also be used as a heartbeat mechanism to inform followers that the leader is still the leader and to check whether a follower is still operating. For example, if a heartbeat communication 150 is responded back to, the follower is operational; if not, the follower may be considered to have failed. Typically, the heartbeat communications 150 do not contain data updates.

To maintain authority as the leader of the Raft group, the leader device sends the heartbeat communications 150 periodically to express dominion to its follower devices. If a heartbeat communication 150 is not received by one or more of the follower devices within an election timeout threshold, the follower device may initiate a leader election. For example, the timed out follower device may change its state to a candidate state, vote for itself to be leader, and issue a RequestVotes RPC for establishing a majority to attempt to become the leader. A candidate node becomes the leader by receiving a majority of votes from the service computing devices 102 in the Raft group. The elected candidate updates its status to leader and starts sending heartbeat communications 150 to notify other nodes in the Raft group of the new leader.

A node may typically start as a follower device and expect a heartbeat communication 150 from the leader. The follower will wait for this heartbeat communication for some amount of time referred to as the election timeout threshold. If the follower device does not receive a heartbeat communication 150 within the timeout threshold, the node will assume the leader is dead and transition to the candidate state as discussed above. This process may be repeated in all the Raft groups in the system 100, which may result in leaders being elected and heartbeat communications being sent at a similar timing by some or all of the plurality of Raft groups and partitions. Further, the heartbeat communication deadlines for each of the followers may be effectively clustered as all of the followers need to receive a heartbeat communication 150 within the same time window to avoid an election timeout from taking place. Accordingly, as the size of the system 100 increases, the individual Raft groups on a single physical node may tend to end up with clustered heartbeat communication deadlines of approximately the same timing.

Additionally, in some cases, a plurality of the service computing devices 102 in the system 100 may handle a plurality of Raft groups, such as by being a leader of one or more Raft groups and/or a follower of one or more other Raft groups. As the system is initiated, the service computing devices 102 may typically have heartbeat communication deadlines that are clustered closely together. Furthermore, actions undertaken by the system 100 to automatically scale and/or adjust to a current load may affect many Raft groups at once, which can also form clusters of heartbeat communications that increase in size as the system increases in scale. In addition, in some examples, the partition associated with a Raft group may be divided into two or more partitions, such as when the size of metadata stored in the partition exceeds a threshold size. As one example, the Raft group may be shut down and two new Raft groups may be formed. Because these two new Raft groups are created at the same time, they may have heartbeat communication deadlines that are clustered together. Furthermore, if splitting the partition results in the metadata being uniformly distributed across these two new Raft groups, these new Raft groups may also be likely to split at the same time, resulting in four Raft groups with clustered heartbeat communication deadlines.

The clustered heartbeat communication deadlines can result in a plurality of heartbeat communications 150 being delivered to the same node concurrently, which can lead to processing delays and unnecessary election timeouts. Accordingly, implementations herein provide a technical solution to the foregoing problems by randomizing the timing of the heartbeat communications 150 sent by each leader device. For example, the random timing may be selected from a range between a specified minimum time and a specified maximum time that, in some cases, may be based on the election timeout threshold. The random timing of the heartbeat communications by each leader device of each of the respective Raft groups effectively reduces or eliminates the clustering of the heartbeat communication deadlines and the resulting unnecessary election timeouts. Additional details of the randomized timing of the heartbeat communications 150 are discussed below.

In some cases, the service computing devices 102 may be arranged into one or more groups, clusters, systems, or the like, at a site 152. Additionally, in some cases a plurality of sites 152 may be geographically dispersed from each other, such as for providing data replication, disaster recovery protection, or the like. Further, in some cases, the service computing devices 102 at a plurality of different sites 152 may be configured for securely communicating with each other, such as for providing a federation of a plurality of sites 152.

Figure 2:
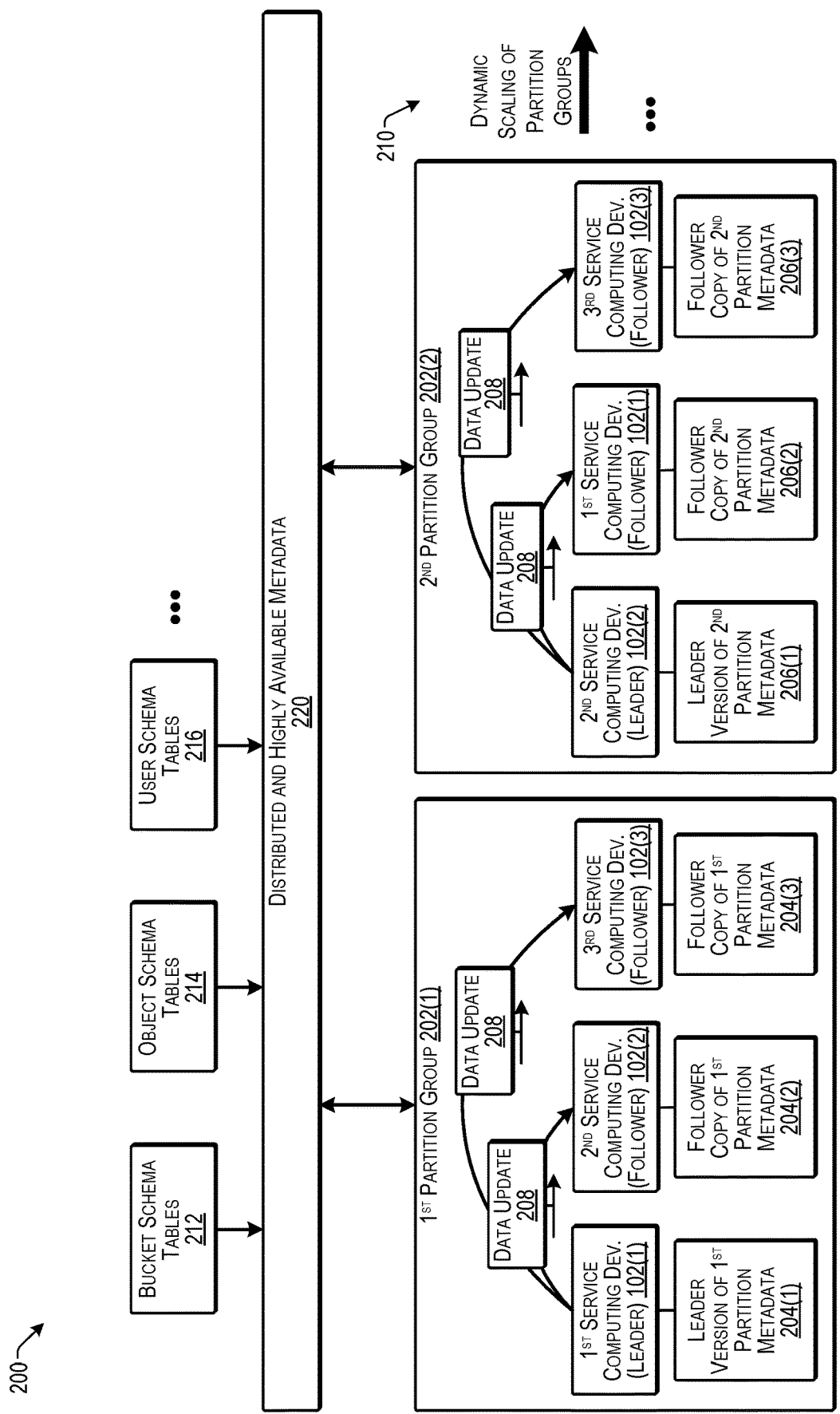
FIG. 2 is a block diagram illustrating an example logical configuration of a portion of a system according to some implementations.

FIG. 2 is a block diagram illustrating an example logical configuration 200 of a portion of a system according to some implementations. In some examples, the logical configuration 200 may correspond to the system 100 discussed above or any of various other possible computing system architectures, as will be apparent to those of skill in the art having the benefit of the disclosure herein. In this example, a plurality of partition groups 202 are illustrated including a first partition group 202(1) and a second partition group 202(2). In some examples, each partition group 202 may correspond to a Raft group configured to operate according to the Raft consensus algorithm, although implementations herein are not necessarily limited to the Raft algorithm. The first partition group 202(1) includes a first service computing device 102(1) as the current leader of the partition group 202(1), a second service computing device 102(2) as a follower, and a third service computing device 102(3) as another follower. Similarly, the second partition group 202(2) includes the second service computing device 102(2) as the current leader of the partition group 202(2), the first service computing device 102(1) as a follower, and the third service computing device 102(3) as another follower.

The first partition group 202(1) manages first partition metadata and the second partition group 202(2) manages second partition metadata, which is different from the first partition metadata. For example, the first partition metadata may be a first portion of metadata from the metadata database 132 discussed above, while the second partition metadata may be a second, different portion of metadata from the metadata database 132. Furthermore, the leader of each partition group 202 may maintain a working version of that partition's metadata while the followers may maintain redundant copies of the metadata maintained by the leader.

Accordingly, with respect to the first partition group 202(1), the first service computing device 102(1) maintains a leader version of the first partition metadata 204(1), the second service computing device 102(2) maintains a follower copy of the first partition metadata 204(2), and the third service computing device 102(3) maintains another follower copy of the first partition metadata 204(3). Similarly, with respect to the second partition group 202(2), the second service computing device 102(2) maintains a leader version of the second partition metadata 206(1), the first service computing device 102(1) maintains a follower copy of the second partition metadata 206(2), and the third service computing device 102(3) maintains another follower copy of the second partition metadata 204(3).

As one example, when the first service computing device 102(1) acting as the leader of the first partition group, makes an update to the leader version of the first partition metadata 204(1), the leader may send the data update 208 to each of the follower devices 102(2) and 102(3). Accordingly, the second service computing device 102(2) and the third service computing device 102(3) may update their respective copies of the first partition metadata 204(2) and 204(3) to maintain consistency with the leader version of the first partition metadata 204(1) maintained by the leader device. The second partition group 202(2) may function in a similar manner.

In the system 200, as indicated at 210, the system 200 may be dynamically scaled by dynamically scaling partition groups to create additional partition groups (not shown in FIG. 2). For instance, as discussed above, the data of one or more of the partition groups 202 may be split to create two or more new partition groups, and may be moved onto one or more additional service computing devices 102 (not shown), such as when the size of the metadata exceeds a size threshold, the access load exceeds a load threshold, an access time exceeds an access time threshold, or the like.

One or more schemas may be applied for organizing the metadata stored by the partition groups 202 by the respective service computing devices 102 in the respective partition groups 202. In some implementations, each schema (e.g., the organization or structure for the database, data, or a portion thereof) may begin with one or more partitions. As discussed above, as a particular partition gets larger, the partition may be dynamically divided into two new partitions, and those new partitions may be distributed to additional separate service computing devices 102, which can essentially double the throughput for that schema. Several nonlimiting examples of schema may include bucket schema tables 212, object schema tables 214, user schema tables 216, and so forth. Each set of schema tables 212-216 may cause the respective corresponding metadata to be organized in a particular manner specified by the respective schema.

Some examples herein may include a Raft-algorithm-based partitioned-and-distributed database able to achieve horizontal scalability. For instance, as more and more data is ingested, the partitions will keep getting larger and, according to implementations herein may continually dynamically split partitioned data of the partition groups 202 to form new partition groups 202. This enables the data in the partitions to be distributed across all the service computing devices 102 in discrete partition groups 202, causing the load on the plurality of service computing devices 102 to be more evenly distributed. Furthermore, as more computing devices are added to the plurality of service computing devices 102, the number of partitions and partition groups 202 may continue to increase, and the partitions may be spread across the system 200 elastically and indefinitely as additional computing nodes are added to the system 200.

Accordingly, as indicated at 220, the examples herein provide distributed and highly available metadata by storing strongly consistent copies of the metadata in a distributed-partition configuration across multiple service computing devices 102. In some cases, the consistency of the distributed data in the distributed partitions may be maintained using the Raft consensus algorithm, although other algorithms that include a leader that sends heartbeat communications to follower devices may also be used. For example, the leader may serve read and write transactions from client devices (not shown in FIG. 2) and may provide data updates to its follower devices. Should the leader computing device 102 fail, one of the follower computing devices 102 may be elected as leader and may take over serving read and write transactions. Client computing devices of the system herein are able to discover which computing node is the leader and direct requests to that computing device. If the leader of a partition group 202 should change, the clients may be automatically routed to the new leader.

Figure 3:
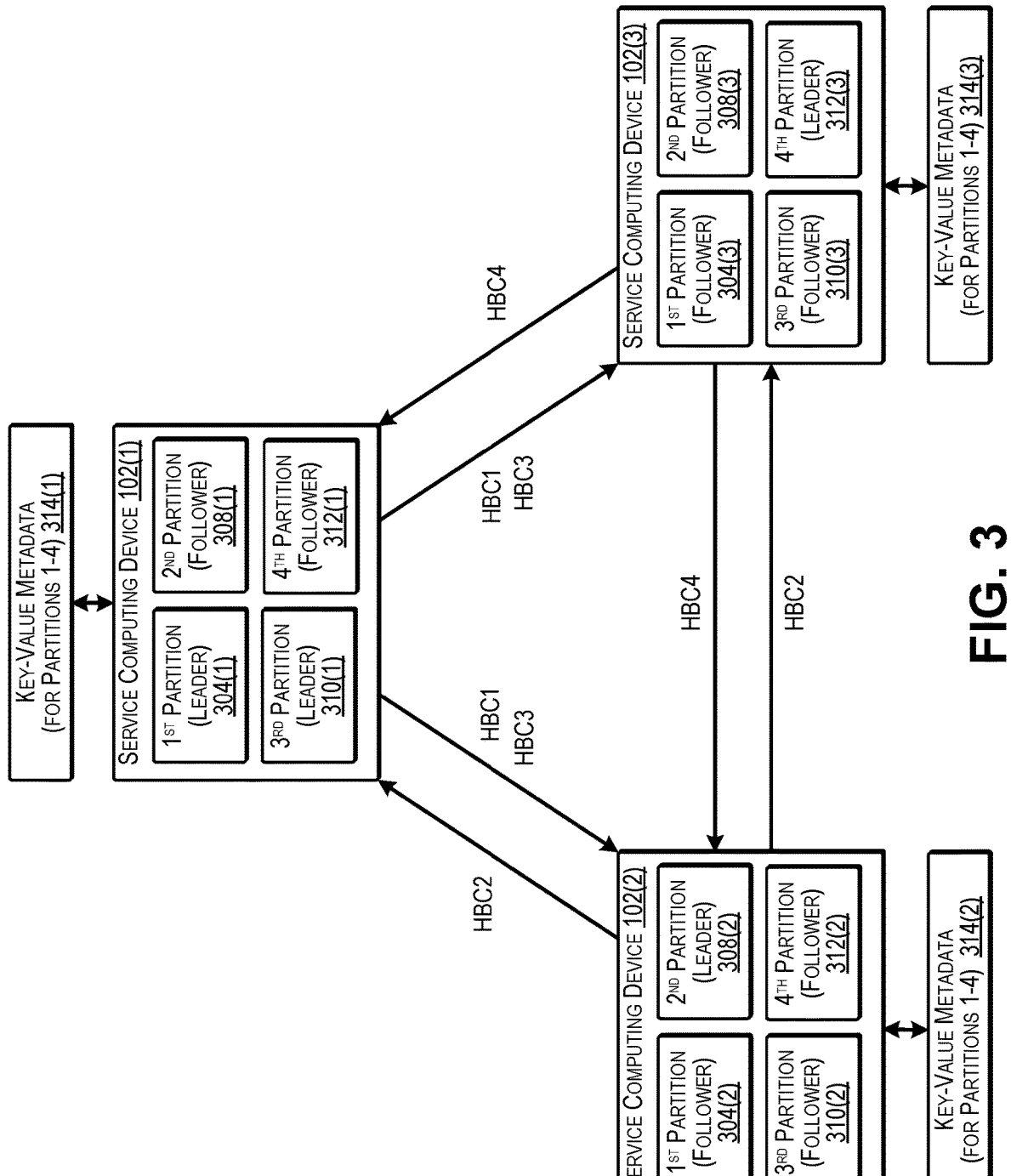
FIG. 3 is a block diagram illustrating an example logical configuration of multiple partitions and heartbeat communications according to some implementations.

FIG. 3 is a block diagram illustrating an example logical configuration 300 of multiple partition groups and heartbeat communications according to some implementations. In some examples, the logical configuration 300 may correspond to a portion of the system 100 discussed above or any of various other possible computing system architectures, as will be apparent to those of skill in the art having the benefit of the disclosure herein. As mentioned above, in some examples herein, each partition group may be a Raft group configured to operate according to the Raft consensus algorithm to provide redundant backups of the partitions. Alternatively, the partition groups may operate according to another algorithm in which partition groups include leaders, followers and heartbeat communications, as described.

When implemented, the Raft algorithm ensures that each service computing device 102 agrees upon the same change to data in a respective partition of a respective partition group. The partition group achieves consensus via an elected leader. The leader may be responsible for replicating changes in the partition data to the follower computing devices in the partition group. The leader may regularly inform the follower devices of its existence by sending a heartbeat communication to the each of the follower devices within a timing based on the election timeout threshold. If the followers do not receive the heartbeat communication from the leader within the election timeout threshold, the followers may initiate a process to elect a new leader from among the followers.

In some examples herein, each partition group maintaining a respective data partition in the distributed database herein may include three partition group members. For instance, the leader may serve data access responses (e.g., reads, writes, and the like) for the partition to clients, while the followers may replicate the data in the partition and any updates to the data to achieve high availability and redundancy. The service computing device 102 that maintains the leader partition may replicate changes in the leader partition data to the follower partitions maintained by other ones of the service computing devices 102. Any service computing device 102 can become the leader for any of the partitions that it manages.

In the illustrated example, a plurality of service computing devices 102(1), 102(2) and 102(3) are included for providing the logical configuration 300. For example, suppose a first partition has been created that includes a first partition leader 304(1) on the service computing device 102(1), and two first partition followers 304(2) and 304(3) on the service computing devices 102(2) and 102(3), respectively; a second partition has been created that includes a second partition leader 308(2) on the service computing device 102(2), and two second partition followers 308(1) and 308(3) on the service computing devices 102(1) and 102(3), respectively; a third partition has been created that includes a third partition leader 310(1) on the service computing device 102(1), and two third partition followers 310(2) and 310(3) on the service computing devices 102(2) and 102(3), respectively; and a fourth partition has been created that includes a fourth partition leader 312(3) on the service computing device 102(3), and two fourth partition followers 312(1) and 312(2) on the service computing devices 102(1) and 102(2), respectively. Further, while only three service computing devices 102 and four partitions are illustrated in this example, in other examples, there may be dozens, hundreds, or even thousands of service computing devices 102 and partitions.

Each service computing device may access its own stored metadata for updating the metadata, such as for responding to client requests in the case of a leader and/or for maintaining consistency with leader data in the case of a follower. In some examples, the metadata may be key-value metadata 314 that is partitioned as the metadata for the first through forth partitions. For example, the service computing device 102(1) maintains the key-value metadata 314(1); the service computing device 102(2) maintains the key-value metadata 314(2); and the service computing device 102(3) maintains the key-value metadata 314(3). Further in some examples, the key-value metadata 314 may be key-value pairs that are arranged according to sets of key-space-ranges, or the like. As one example, in the case of alphabetical keys, the first partition may include a key range from A-C, the second partition may include a key range from D-F, the third partition may include a key range from G-I, the fourth partition may include a key range from J-L, and so forth. Alternatively, in the case that a hash function is used to assign key values, the key ranges for the respective partitions may be numerical ranges. Thus, each partition may be given a partition identifier and a set of key-space-ranges for which the service computing device managing the partition is responsible. Furthermore, implementations herein are not limited to any particular data organization configurations, types of metadata maintained in the metadata database, and the like.

According to some implementations herein, each of the service computing devices 102(1), 102(2) and 102(3), when acting as a leader device for a respective partition group may send a heartbeat communication (HBC) to respective follower devices. Accordingly, the service computing device 102(1), when acting as leader for the first partition 304, sends first partition heartbeat communications HBC1 to the service computing devices 102(2) and 102(3). Similarly, the service computing device 102(1), when acting as leader for the third partition 310, sends third partition heartbeat communications HBC3 to the service computing devices 102(2) and 102(3). Further, the service computing device 102(2), when acting as leader for the second partition 308, sends second partition heartbeat communications HBC2 to the service computing devices 102(1) and 102(3). Additionally, the service computing device 102(3), when acting as leader for the fourth partition 312, sends second partition heartbeat communications HBC4 to the service computing devices 102(1) and 102(2).

Furthermore, each of the service computing devices 102(1), 102(2) and 102(3), when acting as a follower, receives the respective HBCs sent by the respective leader devices. Thus, the service computing device 102(1) receives and processes HBC2 and HBC4; the service computing device 102(2) receives and processes HBC1, HBC3 and HBC4; and the service computing device 102(3) receives and processes HBC1, HBC3 and HBC2. In some examples, processing a received heartbeat communication may include resetting a time for the election timeout threshold.

As mentioned above, in the case of the Raft algorithm, the heartbeat communication may be an empty AppendEntries RPC. Furthermore, the leader of each partition group may maintain an index that is committed in a local log (not shown in FIG. 3), and may send that information in every AppendEntries RPC, including in heartbeat communications. If the partition follower does not find an entry with that index in its local log, the follower may reject the request. Thus, if the AppendEntries RPC returns successfully, the leader knows that its log and the followers' logs are identical.

To avoid clustered processing of the respective heartbeat communications HBC1-HBC4, such as in the case that the respective heartbeat communications HBC1-HBC4 continually arrive at the respective service computing devices 102(1), 102(2) and 102(3) for processing at approximately the same time, a respective leader service computing device may randomize the timing at which a heartbeat communication is sent to its followers for a respective partition. Further, the randomizing of the timing may be subject to a maximum duration heartbeat communication interval and also subject to a minimum interval so that the heartbeat communications are not sent too frequently. As one example, some implementations herein may employ a uniformly distributed randomized heartbeat communication. This technique may ensure that leader devices and follower devices are sending and processing minimal number of heartbeat communications at any given time while still meeting the requirements of the Raft algorithm. Accordingly, this technique increases the probability that each heartbeat communication is sent, received, and processed successfully. Several concrete examples are discussed below with respect to FIG. 4.

Figure 4:
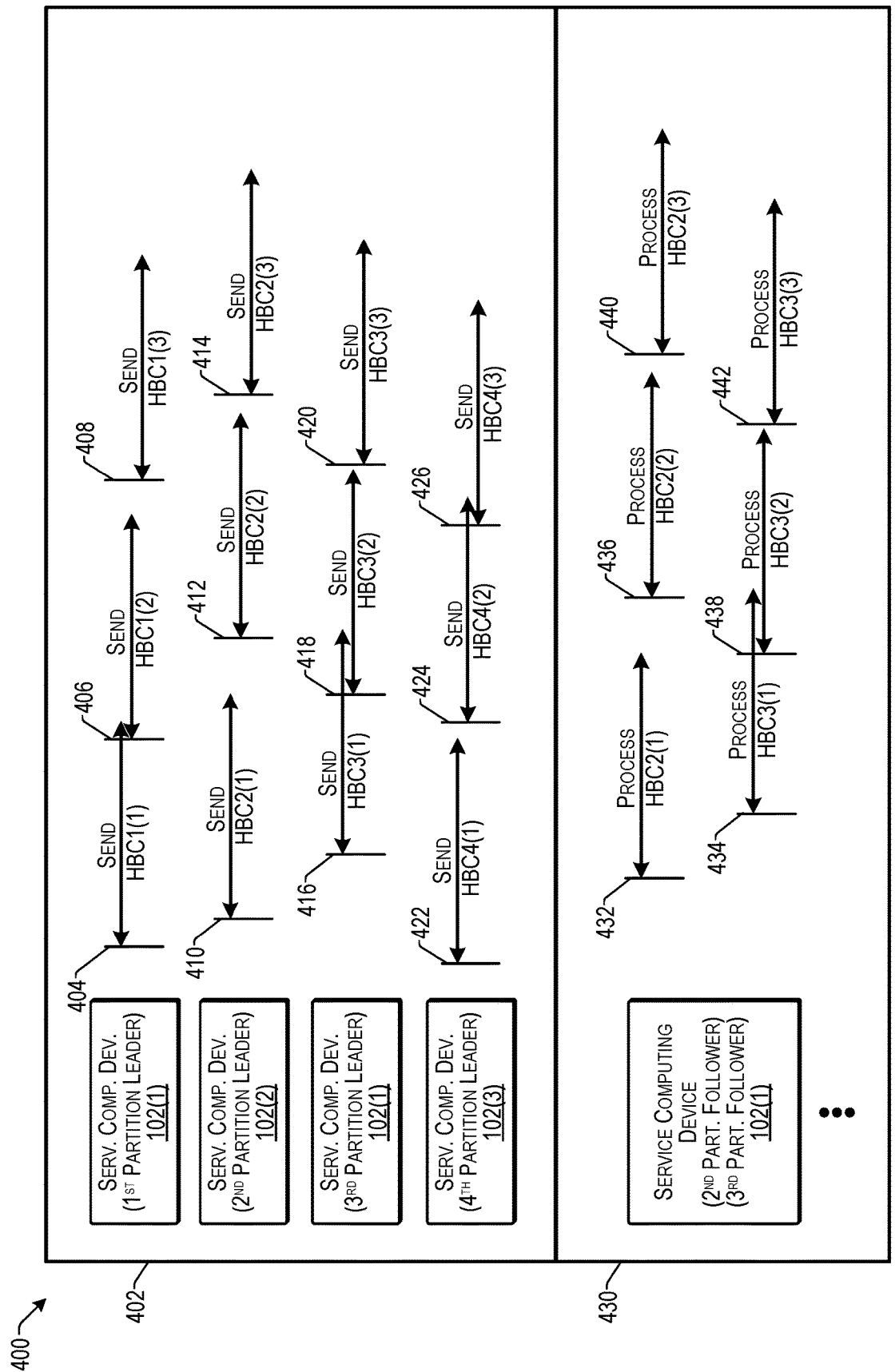
FIG. 4 is a schematic diagram illustrating an example of random heartbeat communications in a plurality of partition groups according to some implementations.

FIG. 4 is a schematic diagram illustrating an example of random heartbeat communications 400 for a plurality of partition groups according to some implementations. For instance, the example of FIG. 4 may be based on the logical configuration 300 of FIG. 3 discussed above. Thus, each service computing device 102 may be part of multiple separate partition groups, such as in a Raft group configuration, with each partition group representing a different partition. As described above, a leader randomizes the time at which a heartbeat communication is sent to its followers, subject to a maximum duration heartbeat interval. By using a uniformly distributed randomized heartbeat timing, the leaders and followers can send and process a minimal number of heartbeats at any given time while still meeting conditions of the Raft algorithm or other algorithm being applied.

In the illustrated example, an upper box 402 includes example timelines of the respective leaders of each partition group for sending respective heartbeat communications (HBCs). For instance, the service computing device 102(1), as first partition leader, may send a first partition heartbeat communication HBC1(1) at a first random time 404 after becoming leader. Next, the service computing device 102(1), as first partition leader, sends a next first partition heartbeat communication HBC1(2) at a random time 406 that is after the first time 404 and that is between a minimum time and a maximum time for sending the next heartbeat communication. As one example, suppose that the election timeout threshold is 800 ms, the minimum time is 300 ms and the maximum time is 400 ms. Accordingly, the next HBC1(2) may be sent at a random time 406 that is between 300 ms and 400 ms after the first time 404. Similarly, a next first partition heartbeat communication HBC1(3) may be sent at a random time 408 between 300 and 400 ms after the time 406. Further, a random time to send the first HBC after being elected first partition leader may be randomly selected from a different time range (e.g., 0-100 ms) than the time range for randomly sending the next HBC1(2), the next HBC1(3), and all the other HBCs sent thereafter.

As mentioned above, in some cases, the maximum and minimum times for the time range for selecting the random time to send the HBCs may be based on the election timeout threshold. For instance, the maximum time (400 ms in this example) may be selected to be one half or less than the election timeout threshold (800 ms in this example). Accordingly, based on this configuration, it is possible for a follower to miss one heartbeat communication and still receive a second heartbeat communication in time to avoid an election timeout and thereby avoid unnecessarily initiating an election process to elect a new leader.

Furthermore, implementations herein are not limited to any particular election timeout threshold or any particular range of maximum and minimum times for sending a next HBC. For instance, suppose that the election timeout threshold is 1600 ms, then, as one example, a suitable range for sending HBCs at a random timing may be between 600-800 ms. This ensures that the leaders are not sending a heartbeat too frequently while randomizing it such that a HBC may occur at any point on the timeline after 600 ms and before 800 ms from the previous point in time at which a previous HBC was sent by that leader. For instance, it may be desirable to limit the minimum time range to around ½ to ¾ of the maximum time to avoid sending HBCs with too great a frequency, which can tend to increase congestion at the follower devices.

Similarly to the example of the first partition discussed above, the service computing device 102(2), as second partition leader, sends an initial HBC2(1) at a first time 410 at a time randomly selected from a first interval ($0<t_1<100$ ms) for sending a first HBC2(1) after being elected, sends a next HBC2(2) at a second time 412 selected from a second interval ($300<t_2<400$) after the first time 410, and sends a next HBC2(3) at a third time 414 selected from the second interval ($300<t_3<400$) after the second time 412; the service computing device 102(1), as third partition leader, sends an initial HBC3(1) at a first time 416 at a time randomly selected from a first interval ($0<t_1<100$ ms) for sending a first HBC3(1) after being elected, sends a next HBC3(2) at a second time 418 selected from a second interval ($300<t_2<400$) after the first time 416, and sends a next HBC3(3) at a third time 420 selected from the second interval ($300<t_3<400$) after the second time 418; and the service computing device 102(3), as fourth partition leader, sends an initial HBC4(1) at a first time 422 at a time randomly selected from a first interval ($0<t_1<100$ ms) for sending a first HBC4(1) after being elected, sends a next HBC4(2) at a second time 424 selected from a second interval ($300<t_2<400$) after the first time 422, and sends a next HBC4(3) at a third time 426 selected from the second interval ($300<t_3<400$) after the second time 424.

Additionally, in some examples, the different partitions may be assigned different election timeout thresholds and/or different ranges of time intervals for selecting the random times. For instance, the first partition may have a time interval ($300<t<400$) for selecting a random time, while the second partition may have a time interval ($275<t<375$) for selecting the random time. Numerous other variations will be apparent to those of skill in the art having the benefit of the disclosure herein.

In addition, as one example, a uniform random distribution may be used to select the random times. However, the random times employed herein are not limited to being determined by any particular randomness algorithm, and may be determined using any of numerous known techniques for generating random or pseudorandom times, random or pseudorandom numbers, or the like. Accordingly, the term "random" herein includes both random and pseudorandom value generation techniques.

In FIG. 4, a lower box 430 includes an example of processing the heartbeat communications received from leader devices. In this example, the service computing device 102(1), as a follower in the second partition group and the third partition group, receives the heartbeat communications sent by the second partition leader and the third partition leader, as discussed above. For instance, suppose the service computing device 102(1) receives the first second partition heartbeat communication HBC2(1) at a time 432, which may correspond to the time 410 discussed above, plus some added time for sending, network latency, and receiving the HBC2(1). Similarly, the service computing device 102(1) receives the first third partition heartbeat communication HBC3(1) at a time 434. Assuming generally consistent network latency for transmissions made within a close time of each other, the time 434 is this example is generally offset from the time 432 by an amount of time similar to an amount time of the offset between the respective transmission times 410 and 416. Accordingly, the HBC2(1) and the HBC3(1) are received at different times, and can thereby be processed according to different timings at the service computing device 102(1). Similarly, the other heartbeat communications HBC2(2) is received at a time 436, which is different from at time 438 at which HBC3(2) is received, and HBC2(3) is received at a time 440, which is different from a time 442 at which HBC3(3) is received. The other heartbeat communications received by the other service computing devices 102(2) and 102(3) (not shown in FIG. 4) acting as followers may be similarly staggered or otherwise spaced out due to the random timing of sending the heartbeat communications, thereby avoiding clustering of HBCs or other congestion for processing of the heartbeat communications at the respective service computing devices 102(2) and 102(3).

Figure 5:
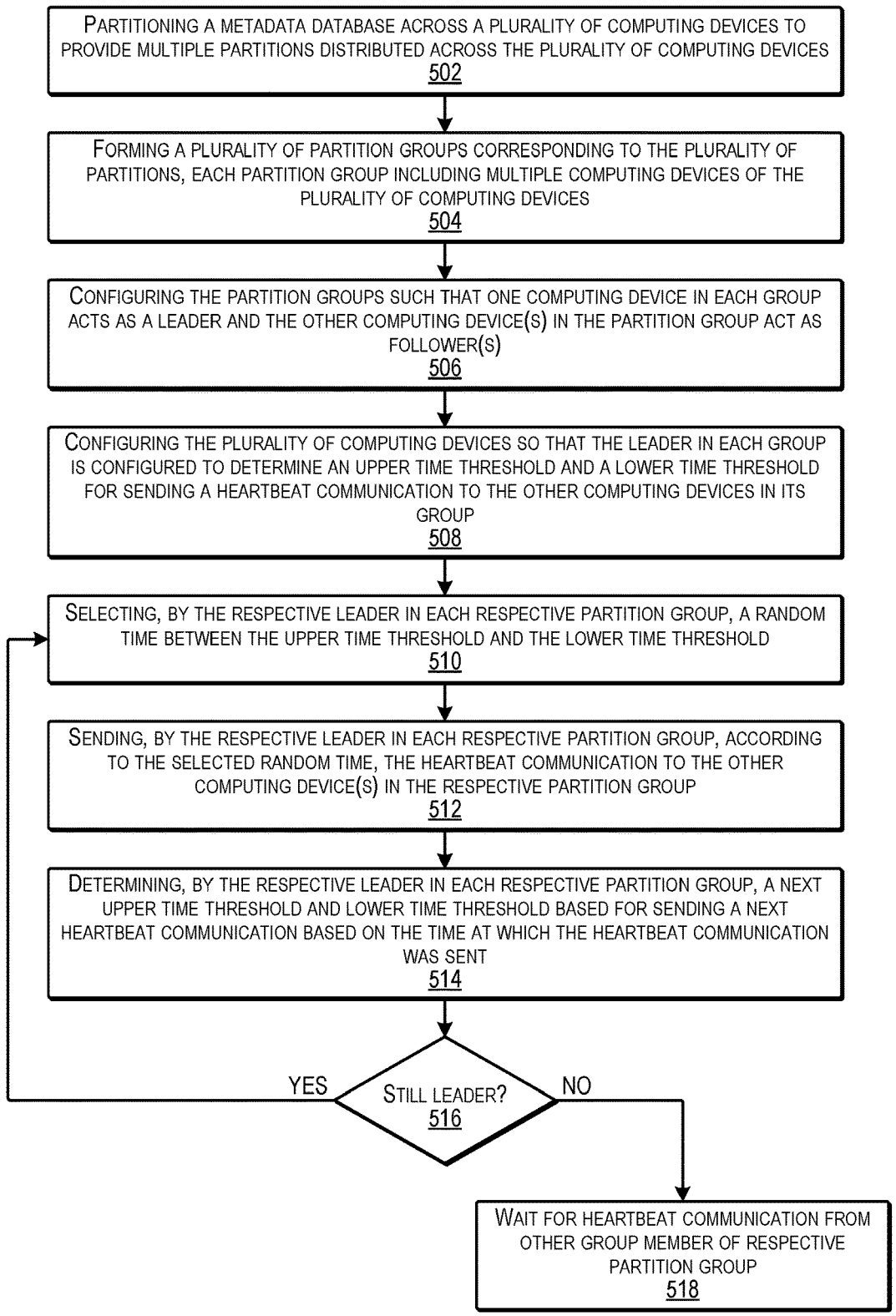
FIG. 5 is a flow diagram illustrating an example process for heartbeat communications for a plurality of partition groups according to some implementations.

FIG. 5 is a flow diagram illustrating an example process for heartbeat communications for a plurality of partition groups according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In FIG. 5, the process 500 may be executed at least in part by the one or more service computing devices 102, such as by executing the node management program 146 and the random heartbeat communication module 148 discussed with respect to FIG. 1.

At 502, the computing device may partition a metadata database across a plurality of computing devices to provide multiple partitions distributed across the plurality of computing devices. For instance, the metadata of the metadata database may be partitioned into a plurality of portions and distributed across a plurality of computing devices to improve accessibility, redundancy and consistency.

At 504, the computing device may form a plurality of partition groups corresponding to the plurality of partitions, each partition group including multiple computing devices of the plurality of computing devices. For example, multiple computing devices may store the same data to provide redundancy of the data in case of failure of one or more computing devices.

At 506, the computing device may configure the partition groups such that one computing device in each group acts as a leader and the other computing device(s) in the partition group act as follower(s). As one example, the partition groups may be configured as Raft groups according the Raft consensus algorithm, although other algorithms that employ heartbeat communications may be used in other examples herein.

At 508, the computing device may configure the plurality of computing devices so that the leader in each group is configured to determine an upper time threshold and a lower time threshold for sending a heartbeat communication to the other computing devices in its group. In some examples, the upper time threshold may be one half of the election timeout threshold. Further, in some examples, the lower time threshold may be one half, two thirds, three quarters, etc. of the upper time threshold.

At 510, the respective leader computing device in each respective partition group selects a random time between the upper time threshold and the lower time threshold. As one example, a uniform random distribution may be used for selecting the random time. In other examples, any other known random value generator or pseudorandom value generator may be used for selecting the random time between the upper time threshold and the lower time threshold.

At 512, the respective leader computing device in each respective partition group, sends, according to the selected random time, the heartbeat communication to the other computing device(s) in the respective partition group.

At 514, the respective leader computing device in each respective partition group, determines a next upper time threshold and lower time threshold based for sending a next heartbeat communication based on the time at which the heartbeat communication was sent.

At 516, the respective leader computing device in each respective partition group, determines whether it is still the leader of the respective partition group. If so, the process returns to 510 and the respective leader computing device selects a next random time between the upper and lower time thresholds. On the other hand, if the respective computing device is no longer the leader, the process goes to 518.

At 518, the respective computing device that is no longer the leader waits for a heartbeat communication from the current leader. If a heartbeat communication is not received prior to an election timeout threshold being reached, the respective computing device may initiate an election procedure.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
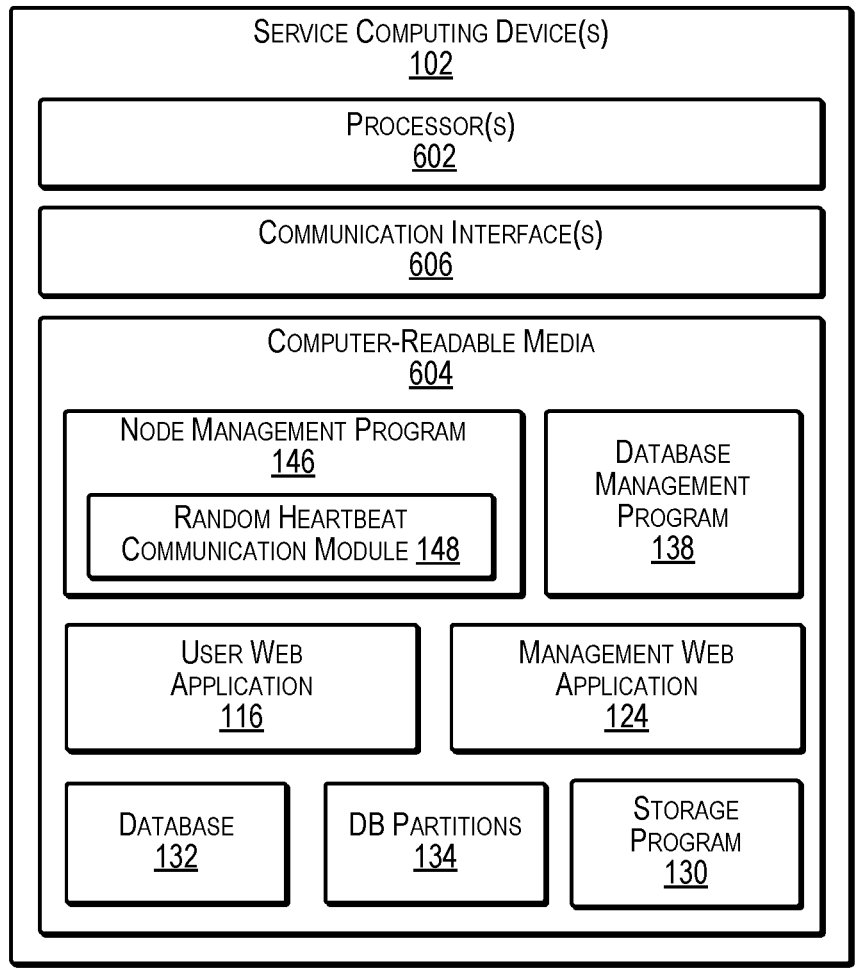
FIG. 6 illustrates select example components of the service computing devices that may be used to implement at least some of the functionality of the systems described herein.

FIG. 6 illustrates select example components of the service computing devices 102 that may be used to implement at least some of the functionality of the systems described herein. The service computing devices 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 602, one or more computer-readable media 604, and one or more communication interfaces 606. Each processor 602 may be a single processing unit or a number of processing units, and may include single or multiple computing units, or multiple processing cores. The processor(s) 602 can be implemented as one or more central processing units, microprocessors, microcomputers, microcontrollers, digital signal processors, state machines, logic circuitries, and/or any devices that manipulate signals based on operational instructions. As one example, the processor(s) 602 may include one or more hardware processors and/or logic circuits of any suitable type specifically programmed or configured to execute the algorithms and processes described herein. The processor(s) 602 may be configured to fetch and execute computer-readable instructions stored in the computer-readable media 604, which may program the processor(s) 602 to perform the functions described herein.

The computer-readable media 604 may include volatile and nonvolatile memory and/or removable and non-removable media implemented in any type of technology for storage of information, such as computer-readable instructions, data structures, program modules, or other data. For example, the computer-readable media 604 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, the computer-readable media 604 may be a tangible non-transitory medium to the extent that, when mentioned, non-transitory computer-readable media exclude media such as energy, carrier signals, electromagnetic waves, and/or signals per se. In some cases, the computer-readable media 604 may be at the same location as the service computing device 102, while in other examples, the computer-readable media 604 may be partially remote from the service computing device 102. For instance, in some cases, the computer-readable media 604 may include a portion of storage in the network storage 104 discussed above with respect to FIG. 1.

The computer-readable media 604 may be used to store any number of functional components that are executable by the processor(s) 602. In many implementations, these functional components comprise instructions or programs that are executable by the processor(s) 602 and that, when executed, specifically program the processor(s) 602 to perform the actions attributed herein to the service computing device 102. Functional components stored in the computer-readable media 604 may include the node management program 146 that may be executed by a respective service computing device 102 for managing partitions on the service computing device 102, such as for receiving and responding to communications from other service computing devices 102 and client devices, executing operations according to the Raft algorithm or other suitable algorithms, performing partition splits and merges, and so forth. The node management program 146 includes the random heartbeat communication module that may be executed to cause the partition module leaders to generate the heartbeat communications at a random time between upper and lower time boundaries, as discussed above. Additional functional components stored in one or more of the service computing devices 102 may include the user web application 116, the management web application 124, the storage program 130, and the database management program 138, each of which may include one or more computer programs, applications, executable code, or portions thereof. Further, while these programs are illustrated together in this example, during use, some or all of these programs may be executed on separate service computing devices 102.

In addition, the computer-readable media 604 may store data, data structures, and other information used for performing the functions and services described herein. For example, the computer-readable media 604 may store the metadata database 132 including the DB partitions 134 which may include metadata, such as key-value pairs or the like. Further, while these data structures are illustrated together in this example, during use, some or all of these data structures may be stored on separate service computing devices 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 606 may include one or more software and hardware components for enabling communication with various other devices, such as over the one or more network(s) 106, 107. For example, the communication interface(s) 606 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a plurality of computing devices able to communicate with each other, each computing device maintaining at least one partition of a metadata database in which the metadata database is partitioned into multiple partitions distributed across the plurality of computing devices, wherein a first computing device of the plurality of computing devices is configured by executable instructions to perform operations comprising:
determining that the first computing device is a leader of at least a first partition group corresponding to a first partition of the multiple partitions, the first partition group including at least one other computing device of the plurality of computing devices;
determining a first time threshold for a heartbeat communication to be sent to the at least one other computing device in the first partition group;
selecting a random time before the first time threshold to send the heartbeat communication, wherein the random time is selected based at least in part on a uniform random distribution; and
sending, to the at least one other computing device in the first partition group, according to the selected random time, the heartbeat communication.

2. The system as recited in claim 1, wherein selecting the random time before the first time threshold to send the heartbeat communication comprises:
selecting the random time between an upper time limit corresponding to the first time threshold and a lower time limit, wherein the lower time limit is at least one half of the upper time limit.

3. The system as recited in claim 2, the operations further comprising:

determining a time at which the heartbeat communication was sent; and determining the upper time limit and the lower time limit for a next heartbeat communication based at least on the time at which the heartbeat communication was sent.

4. The system as recited in claim 1, the operations further comprising:

determining that the first computing device is a leader of a second partition group corresponding to a second partition of the multiple partitions, the second partition group including a plurality of second computing devices of the plurality of computing devices;

determining a second time threshold for another heartbeat communication to be sent to the plurality of second computing devices in the second partition group, wherein the second time threshold is based on timing of a prior heartbeat communication sent to the plurality of second computing devices and is different from the first time threshold;

selecting another random time before the second time threshold to send the other heartbeat communication; and sending, to the plurality of second computing devices in the second partition group, according to the selected other random time, the other heartbeat communication.

5. The system as recited in claim 4, wherein:

one of the second computing devices of the plurality of second computing devices is included in the first partition group and receives both the heartbeat communication and the other heartbeat communication; and the heartbeat communication and the other heartbeat communication are likely to be received at different times due to the selection of the random time and the other random time.

6. The system as recited in claim 1, wherein the first computing device is designated as a follower in a second partition group, the operations further comprising:

receiving, by the first computing device, a first heartbeat communication from a leader computing device of the second partition group, wherein the leader computing device of the second partition group sends the first heartbeat communication based on a randomly selected timing selected within an upper time limit that is less than an election timeout threshold.

7. The system as recited in claim 6, the operations further comprising, based at least in part on receiving the first heartbeat communication from the leader computing device of the second partition group, resetting a timing of the election timeout threshold at the first computing device.

8. The system as recited in claim 1, wherein the first computing device is designated as a follower in a second partition group, the operations further comprising:

waiting to receive a heartbeat communication from a leader computing device of the second partition group; and based at least on expiration of an election timeout threshold for a time period during which a heartbeat communication was not received from the leader computing device of the second partition group, sending, by the first computing device, at least one communication to initiate election of a new leader of the second partition group.

9. The system as recited in claim 1, wherein the first partition group is one of a plurality of partition groups, wherein individual partition groups of the plurality of partition groups are each configured as a respective Raft group according to the Raft consensus algorithm, each Raft group including an elected leader computing device and at least one follower computing device.

10. The system as recited in claim 1, wherein:

the system is in communication with a network storage; and the metadata database includes key-value pair information corresponding to objects stored by the network storage.

11. A method comprising:

determining, by a first computing device of a plurality of computing devices, that the first computing device is a member of at least a first partition group corresponding to a first partition of multiple partitions of a metadata database, the first partition group including at least one other computing device of the plurality of computing devices, each computing device of the plurality of computing devices maintaining at least one partition of the metadata database, partitioning the metadata database into multiple partitions distributed across the plurality of computing devices;

determining, by the first computing device, a first time threshold for a heartbeat communication to be sent to the at least one other computing device in the first partition group;

selecting, by the first computing device, a random time before the first time threshold to send the heartbeat communication, wherein the first computing device selects the random time between an upper time limit corresponding to the first time threshold and a lower time limit, wherein the lower time limit is at least one half of the upper time limit; and sending, by the first computing device, to the at least one other computing device in the first partition group, based on the selected random time, the heartbeat communication.

12. The method as recited in claim 11, further comprising:

determining a time at which the heartbeat communication was sent; and determining the upper time limit and the lower time limit for a next heartbeat communication based at least on the time at which the heartbeat communication was sent.

13. The method as recited in claim 11, further comprising:

determining that the first computing device is a leader of a second partition group corresponding to a second partition of the multiple partitions, the second partition group including a plurality of second computing devices of the plurality of computing devices;

determining a second time threshold for another heartbeat communication to be sent to the plurality of second computing devices in the second partition group, wherein the second time threshold is based on timing of a prior heartbeat communication sent to the plurality of second computing devices and is different from the first time threshold;

selecting another random time before the second time threshold to send the other heartbeat communication; and sending, to the plurality of second computing devices in the second partition group, according to the selected other random time, the other heartbeat communication.

14. The method as recited in claim 11, wherein the first computing device is designated as a follower in a second partition group, the method further comprising:

receiving, by the first computing device, a first heartbeat communication from a leader computing device of the second partition group,
wherein the leader computing device of the second partition group sends the first heartbeat communication based on a randomly selected timing selected within an upper time limit that is less than an election timeout threshold.

15. The method as recited in claim 11, wherein the first computing device is designated as a follower in a second partition group, the method further comprising:
waiting to receive a heartbeat communication from a leader computing device of the second partition group; and
based at least on expiration of an election timeout threshold for a time period during which a heartbeat communication was not received from the leader computing device of the second partition group, sending, by the first computing device, at least one communication to initiate election of a new leader of the second partition group.

16. One or more non-transitory computer-readable media storing instructions that, when executed by a first computing device of a plurality of computing devices, configure the first computing device to perform operations comprising:
determining, by the first computing device, that the first computing device is a member of at least a first partition group corresponding to a first partition of multiple partitions of a metadata database, the first partition group including at least one other computing device of the plurality of computing devices, each computing device of the plurality of computing devices maintaining at least one partition of the metadata database, partitioning the metadata database into multiple partitions distributed across the plurality of computing devices;
determining, by the first computing device, a first time threshold for a heartbeat communication to be sent to the at least one other computing device in the first partition group;
selecting, by the first computing device, a random time before the first time threshold to send the heartbeat communication, wherein the first computing device selects the random time between an upper time limit corresponding to the first time threshold and a lower time limit, wherein the lower time limit is at least one half of the upper time limit; and
sending, by the first computing device, to the at least one other computing device in the first partition group, based on the selected random time, the heartbeat communication.

17. The one or more non-transitory computer-readable media as recited in claim 16, the operations further comprising:
determining a time at which the heartbeat communication was sent; and
determining the upper time limit and the lower time limit for a next heartbeat communication based at least on the time at which the heartbeat communication was sent.

18. The one or more non-transitory computer-readable media as recited in claim 16, the operations further comprising:
determining that the first computing device is a leader of a second partition group corresponding to a second partition of the multiple partitions, the second partition group including a plurality of second computing devices of the plurality of computing devices;
determining a second time threshold for another heartbeat communication to be sent to the plurality of second computing devices in the second partition group, wherein the second time threshold is based on timing of a prior heartbeat communication sent to the plurality of second computing devices and is different from the first time threshold;
selecting another random time before the second time threshold to send the other heartbeat communication; and
sending, to the plurality of second computing devices in the second partition group, according to the selected other random time, the other heartbeat communication.

19. The one or more non-transitory computer-readable media as recited in claim 16, wherein the first computing device is designated as a follower in a second partition group, the operations further comprising:
receiving, by the first computing device, a first heartbeat communication from a leader computing device of the second partition group,
wherein the leader computing device of the second partition group sends the first heartbeat communication based on a randomly selected timing selected within an upper time limit that is less than an election timeout threshold.

20. The one or more non-transitory computer-readable media as recited in claim 16, wherein the first computing device is designated as a follower in a second partition group, the operations further comprising:
waiting to receive a heartbeat communication from a leader computing device of the second partition group; and
based at least on expiration of an election timeout threshold for a time period during which a heartbeat communication was not received from the leader computing device of the second partition group, sending, by the first computing device, at least one communication to initiate election of a new leader of the second partition group.

* * * * *